United States Patent [19]
Cadée et al.

[11] Patent Number: 5,569,108
[45] Date of Patent: Oct. 29, 1996

[54] HYBRID DRIVING SYSTEM

[75] Inventors: Theodorus P. Cadée, Asten; Jacobus H. Van Rooij, Nuenen, both of Netherlands

[73] Assignee: Gear Chain Industrial B.V., Nuenen, Netherlands

[21] Appl. No.: 428,249

[22] PCT Filed: Sep. 28, 1993

[86] PCT No.: PCT/NL93/00192

§ 371 Date: Apr. 27, 1995

§ 102(e) Date: Apr. 27, 1995

[87] PCT Pub. No.: WO94/10001

PCT Pub. Date: May 11, 1994

[30] Foreign Application Priority Data

Oct. 30, 1992 [NL] Netherlands ............... 9201893

[51] Int. Cl.⁶ ..................................... B60K 6/10
[52] U.S. Cl. ................................. 475/1; 475/210
[58] Field of Search ...................... 475/1, 210, 211, 475/214

[56] References Cited

U.S. PATENT DOCUMENTS

| | | | |
|---|---|---|---|
| 3,939,732 | 2/1976 | Giacosa | 475/210 |
| 4,060,012 | 11/1977 | Giacosa | 475/210 |
| 4,392,394 | 7/1983 | Hofbauer | 475/210 |
| 4,502,352 | 3/1985 | Svab | 475/210 |
| 4,539,866 | 9/1985 | Koivunen | 475/210 |
| 4,608,885 | 9/1986 | Koivunen | 475/210 |
| 4,799,485 | 10/1988 | Dollison et al. | 475/210 |
| 5,201,691 | 4/1993 | Doyle | 475/210 |

FOREIGN PATENT DOCUMENTS

| | | |
|---|---|---|
| 43909 | 1/1982 | European Pat. Off. . |
| 2467095 | 4/1981 | France . |
| 1494095 | 12/1977 | United Kingdom . |
| 9108919 | 6/1991 | WIPO . |

*Primary Examiner*—Dirk Wright
*Attorney, Agent, or Firm*—Pennie & Edmonds

[57] ABSTRACT

Driving system containing at a minimum a first planetary coupling, equipped with a central wheel spindle, a planetary spindle and an annular ring spindle, a first driving component coupled to the central wheel spindle, a second driving component coupled to the planetary spindle, a continuously variable transmission with a primary axle and a secondary axle for the driving of a driving gear; and switchable couplings which on the one hand are connected to the planetary spindle and the annular ring spindle and on the other hand are connected to the fixed surroundings and the primary axle. By adjusting the switched states with the aid of the couplings, a large number of practical energy exchange paths, which can be increased in number by the fitting of a second planetary coupling furnished with a central wheel spindle coupled rigidly to the central wheel spindle of the first planetary coupling, and furnished with a planetary spindle coupled rigidly to the planetary spindle of the first planetary coupling, and switchable couplings which on the one hand are connected to the planetary spindle and the annular ring spindle of the second planetary coupling, and on the other hand are connected to a driving axle of the second driving component, can be attained.

14 Claims, 6 Drawing Sheets

HYBRID DRIVING SYSTEM

BACKGROUND OF THE INVENTION

The invention pertains to a hybrid driving system.

Such hybrid driving systems are long-known subjects of research, whereby, in particular, possibilities are sought to develop a driving system which can be simply constructed and which is capable of regulating energy-flows between driving components, energy storage device(s), and the actual loading process.

As far as the application of such hybrid systems is concerned, one can think of, for example, heat-energy coupled systems or of systems for extracting energy from, among other things, tidal currents or the wind, while directed towards vehicles one can think of railway or road-transport vehicles. The term driving component should be interpreted in the most general sense; that is to say as an active component, as in the case of a motor, for example, as a hydraulic, pneumatic, electric or internal-combustion engine, and without regard to the direction of rotation thereof, but also as a passive component; that is to say as an energy absorber, for example a generator or a pump. The energy storage device can be, for example, an electrochemical component such as an accumulator battery, or a mechanical component such as a flywheel, but a device for the storage of energy based on the compression of a gas is just as applicable.

In the case of a vehicle, the loading process can be seen as the process wherein the power developed by the hybrid driving system is used for driving a driving gear connected to the wheels of this vehicle, or, inversely, as the process wherein the driving gear delivers energy back to one or more of the said components.

The systems known until now are of such a nature that using simple means to influence the magnitudes and directions of the energy flows between the various components, which components can be driven passively or actively, leaves much to be desired, whereby too much energy, in the form of braking energy in vehicle systems, for example, is lost. Moreover, in the known hybrid systems the motor is often not driven in an operating range with optimal efficiency, whereby in connection with the desired acceleration, an internal combustion engine must be capable of delivering a relatively excessive amount of power, leading to a high emission of exhaust gases and the production of large amounts of noise. In hybrid driving systems which are also equipped with electric drive and whereby use is made of an accumulator battery, a fuel cell, the public electricity network, or another source of electric energy, the electric motor and the electric energy source must be, in connection with the desired acceleration capabilities of the vehicle, capable of delivering large amounts of power, which requirement makes the driving system heavy and expensive.

The intention of the current invention is to provide a hybrid driving system wherein the influencing of magnitudes and directions of the various energy flows facilitates an optimal and low-loss transfer of energy between the various components.

To this end, the hybrid driving system according to the invention contains, at least, a first planetary coupling, equipped with a central wheel spindle, a planetary spindle and an annular ring spindle, a first driving component coupled to the central wheel spindle, a second driving component coupled to the planetary spindle, a continuously variable transmission (hereinafter referred to as CVT) with a primary axle and a secondary axle and switchable clutches to provide several driving modes and is characterized in that the secondary axle of the continuously variable transmission forms the outgoing axle of the hybrid driving system to be drivingly connected to the input of the load and said switchable clutches are connected on the one hand to the planetary spindle and the annular ring spindle and on the other hand to the fixed surroundings and the primary axle of the continuously variable transmission.

SUMMARY OF THE INVENTION

An advantage of the hybrid driving system according to the invention over a system described in EP-A-43909 is that it provides for the possibility of switching in various combinations of couplings in certain switched states, whereby energy paths between the driving components are made free, to choice. Because the CVT is switched in such a manner that it is situated in each path to the driving gear, influencing of the magnitude of the related energy flow to and from the driving gear is possible at any time.

Of advantage is the fact that each type of planetary coupling or, in short, planetary set, regardless of the means of construction thereof, can, in principle, be applied in the driving system according to the invention. In the figures which will be discussed later, a simple and most often applied embodiment has been chosen.

Moreover, it is an advantage that every current type of CVT can be applied. Examples which can be thought of in this light include hydraulic, hydrostatic, hydrodynamic, V-belt chain, V-belt pushing ribbon, toroidal, or other type of mechanical transmission, or also an electrical CVT.

The construction of the hybrid driving system according to the invention is such that the choice of the first and second driving components, which components can, in their most general form, generate or dissipate energy, can be made freely. In many practical situations the one driving component shall be an internal combustion engine and the other driving component shall be a mechanical/hydraulic, mechanical/pneumatic, or otherwise electromechanical converter, in which last case the converter can be driven as an electric motor or as an electric generator. Another practical case concerns the implementation whereby the one driving component is an electromechanical converter and the other is a flywheel. In yet another combination, an (internal combustion) engine and a flywheel are used. (see claims 2 and 4)

A compact means of construction of the driving system according to the invention arises when the central wheel spindle is implemented in a hollow fashion and the planetary spindle if allowed to run from the planetary coupling placed on one side of a flywheel through the hollow central wheel spindle to the second driving component situated at the other side of the flywheel. (see claim 2)

A preferential embodiment with many possibilities for application arises in a hybrid driving system according to the invention, embracing a second planetary coupling furnished with planetary spindle coupled rigidly to the planetary spindle of first planetary coupling, and switchable clutches which on the one hand are connected to the planetary spindle and the annular ring spindle of the second driving component, and on the other hand are connected to a driving axle of the second driving component. (see claim 3)

The advantage of the preferential embodiment of the hybrid driving system according to the invention is that through the use of the second planetary coupling the total number of switch states which can be realised with the help of the switchable clutches is further increased, whereby optimalisation of even larger numbers of application and usage possibilities arise.

A particular preferential embodiment of the hybrid driving system according to the invention arises when the first driving component is a rotatable electromagnetically implemented flywheel in a housing. (see claims 4 and 5)

Here, the choice can be made for magnetic affixed to the flywheel combined with coil affixed to the housing, which coils are magnetically coupled to the magnets. An inverse situation is also possible, but then it will be necessary to apply dragging rings to furnish the electromagnetic coils on the flywheel with current.

Of advantage is the fact that the mechanical and, at the same time, electromagnetic flywheel makes the hybrid driving system suitable for use as, with the assistance of suitable electric steering means connected to the coils, an electric motor, or as an electric brake, or, otherwise, as an electric generator, as desired, in which last case an accumulator battery placed in a vehicle can be charged with said generator. Moreover, when in this case an internal combustion engine is applied, the generator which is normally mounted on this internal combustion engine becomes unnecessary, because the electromechanical flywheel can supply the required electrical energy.

It is of further advantage that, in the case of an internal combustion engine, said engine can be started by means of the rotation of the flywheel, whereby the starter motor normally mounted on the engine can be omitted. If desired, but not of necessity, the flywheel can simultaneously be driven as an electric motor or as an electric generator.

A further preferential embodiment arises in that the second driving component is an internal combustion engine with an engine flywheel which can be operated by a switchable coupling. (see claim 6)

The engine flywheel which is essential for the prevention of vibrations in internal combustion engines, is brought into motion before the internal combustion engine itself is coupled in, so that a coupling shock which results from the simultaneous bringing into motion of the engine and the engine flywheel is reduced.

In yet another preferential embodiment, the first driving component, which component is embodied as a flywheel, and/or the engine flywheel of the second driving component, are mounted in a rotatable manner in a low-friction housing, whereby, as a result of the vacuum extraction which often takes place within the housing, or the filling of the housing with a gas with the correct properties, the friction losses in question will be very small indeed. The flywheel and the engine flywheel are both preferably integrated in the housing. (see claim 7)

An eccentric positioning of the first driving component becomes possible in a further embodiment of the hybrid driving system, in which system a transmission in switched between the (common) central wheel spindle and the first driving component, which eccentric positioning, for reasons of construction, can be important, for example, in the case where the implementation of the driving component in question is as a flywheel and/or as a hydraulic converter and/or electric converter. The transmission itself can have any desired form, and can, for example, be embodied as a set of cogs, a toothed-belt transmission or as a belt transmission.

Of advantage is the fact that any type of current coupling can be used as a switchable coupling, whereby one can think of examples such as a dry plate or wet plate coupling or a laminated coupling, in which last case a hydraulic laminated coupling which can be easily power-assisted is preferable. (see claims 9 and 10)

In a particular embodiment of the hybrid driving system according to the invention, use is made of means with whose help a variable maximum loading state can be given to the flywheel, whereby the maximum amount of kinetic energy stored in the flywheel is adjustable and can be tuned to the momentary energy requirements.

This is of advantage in certain applications. For example, in a vehicle which must be suitable for use largely in city traffic and largely on the motorways. In city traffic, in order to limit the frictional losses in the hybrid driving system, it is preferable not to make the maximum applied loading state any higher that is necessary for the realisation of acceleration to the maximum allowed speed. On the other hand, a higher maximum loading state can be applied on motorways, adjusted to the maximum speed limits which are valid there. (see claim 14)

The invention and its further accompanying advantages shall be further elucidated on the basis of the attached figures, within which figures the same reference numbers are used to indicate similar components. In this manner.

Figure 1:
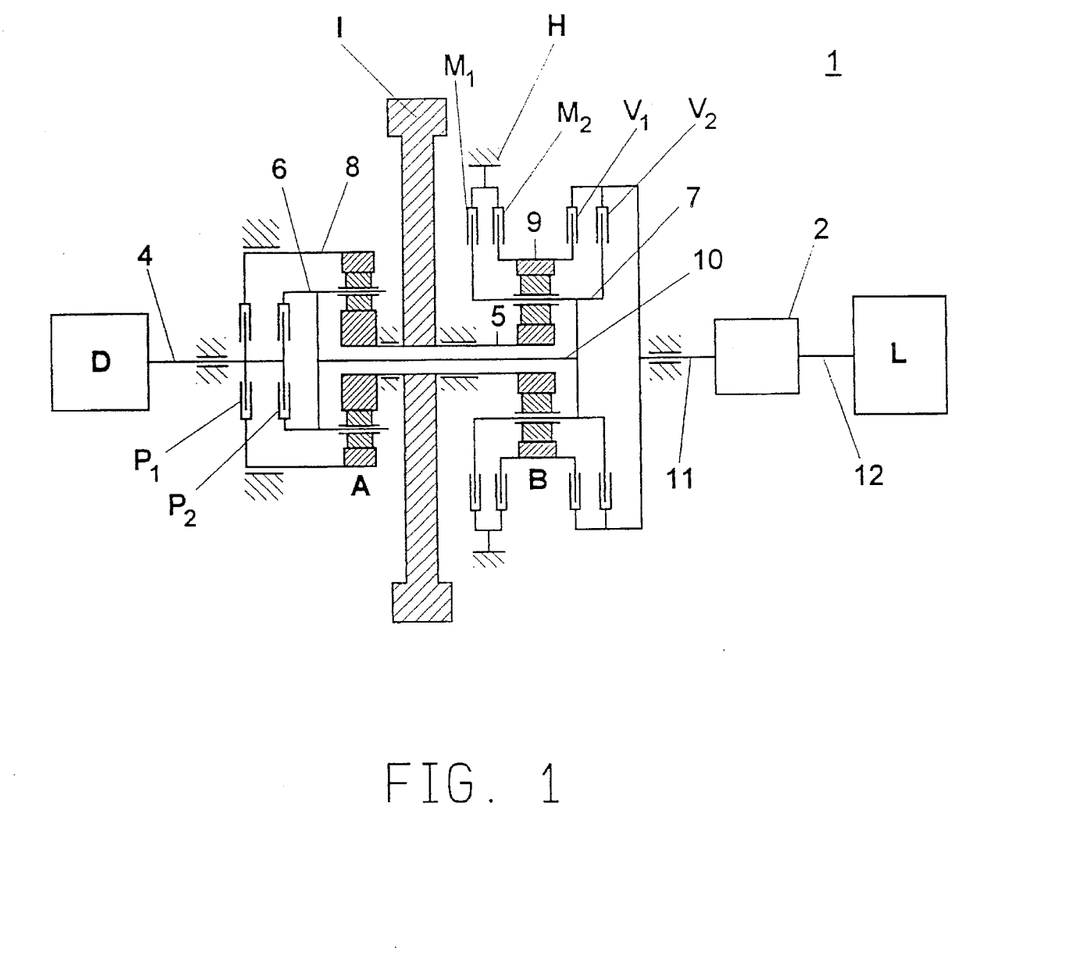
FIG. 1 depicts an embodiment of the hybrid driving system according to the invention, which, due to its large possibilities for application, enjoys technical preference.
Figure 2:
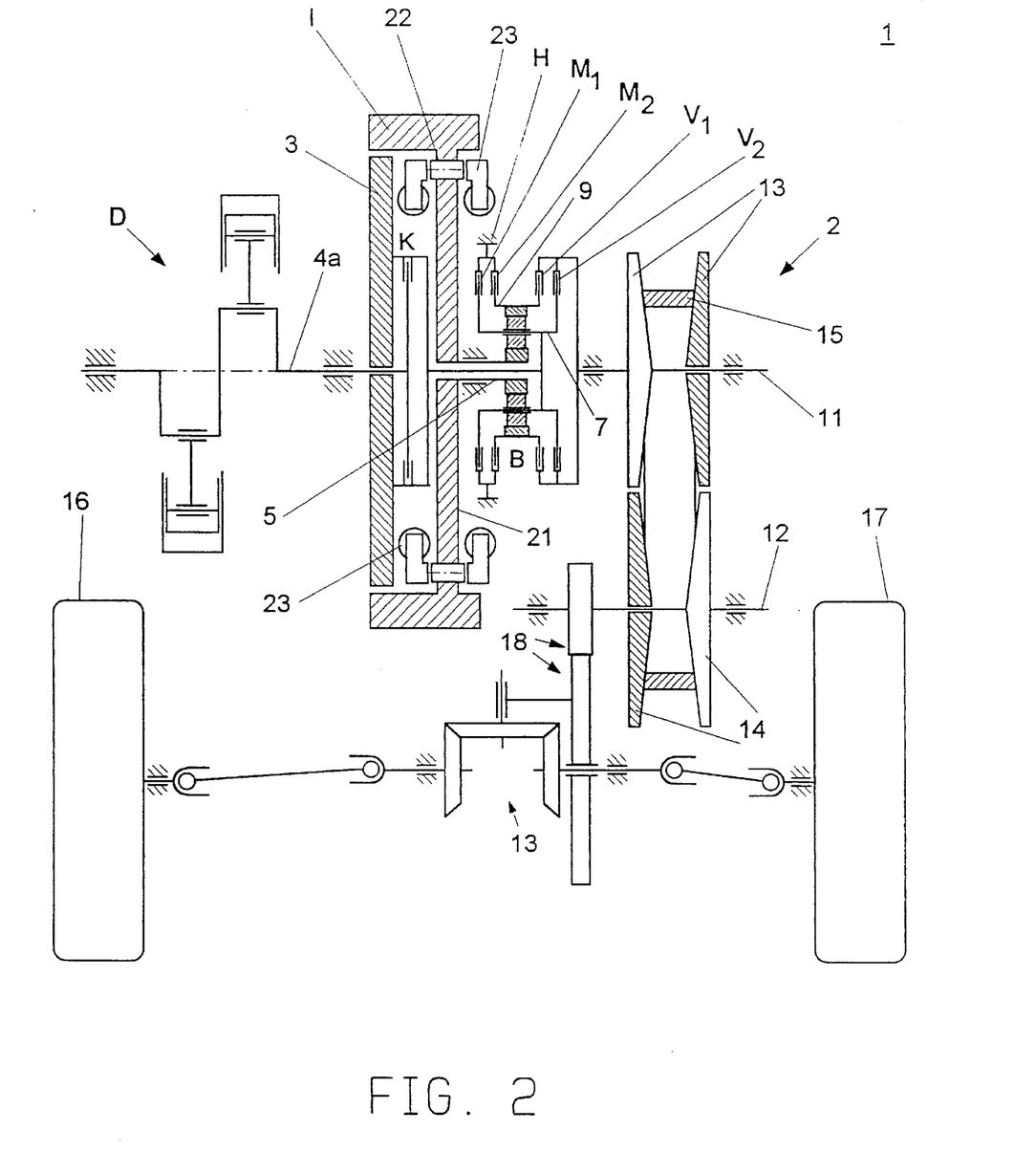
FIG. 2 depicts a further embodiment of the hybrid driving system according to the invention, in which system a flywheel is embodied as an electromagnetic converter.
Figure 3A:
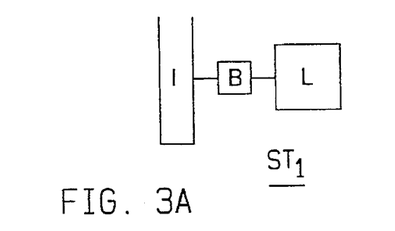
FIG. 3 depicts a schematic overview of ten switch states which can be realised with the aid of the embodiment of FIG. 1.
Figure 3B:
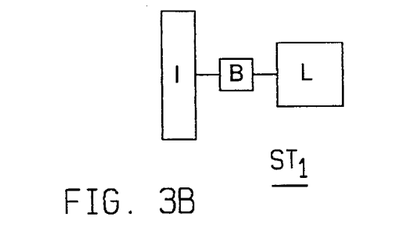
Figure 3C:
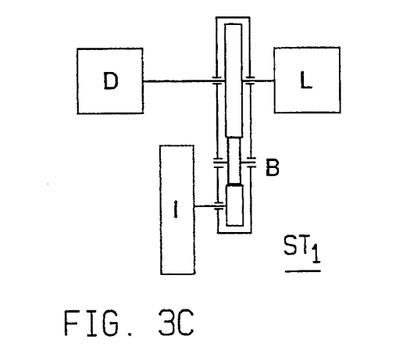
Figure 3D:
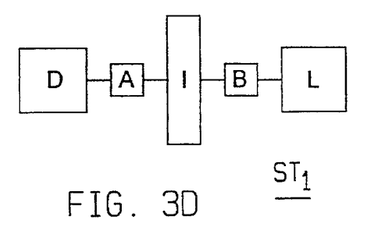
Figure 3E:
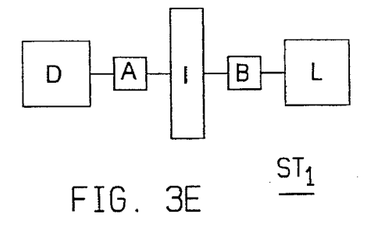
Figure 3F:
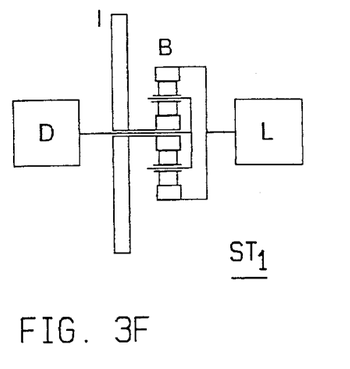
Figure 3G:
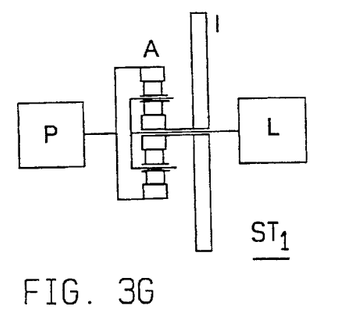
Figure 3H:
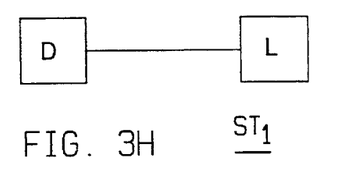
Figure 3I:
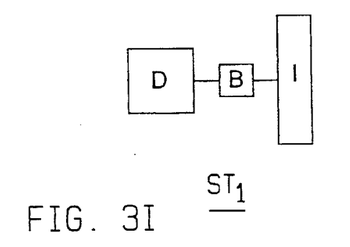
Figure 3J:
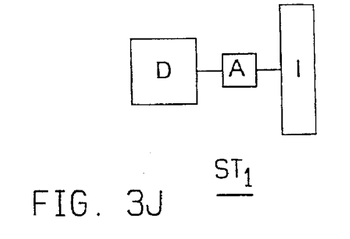
Figure 8:
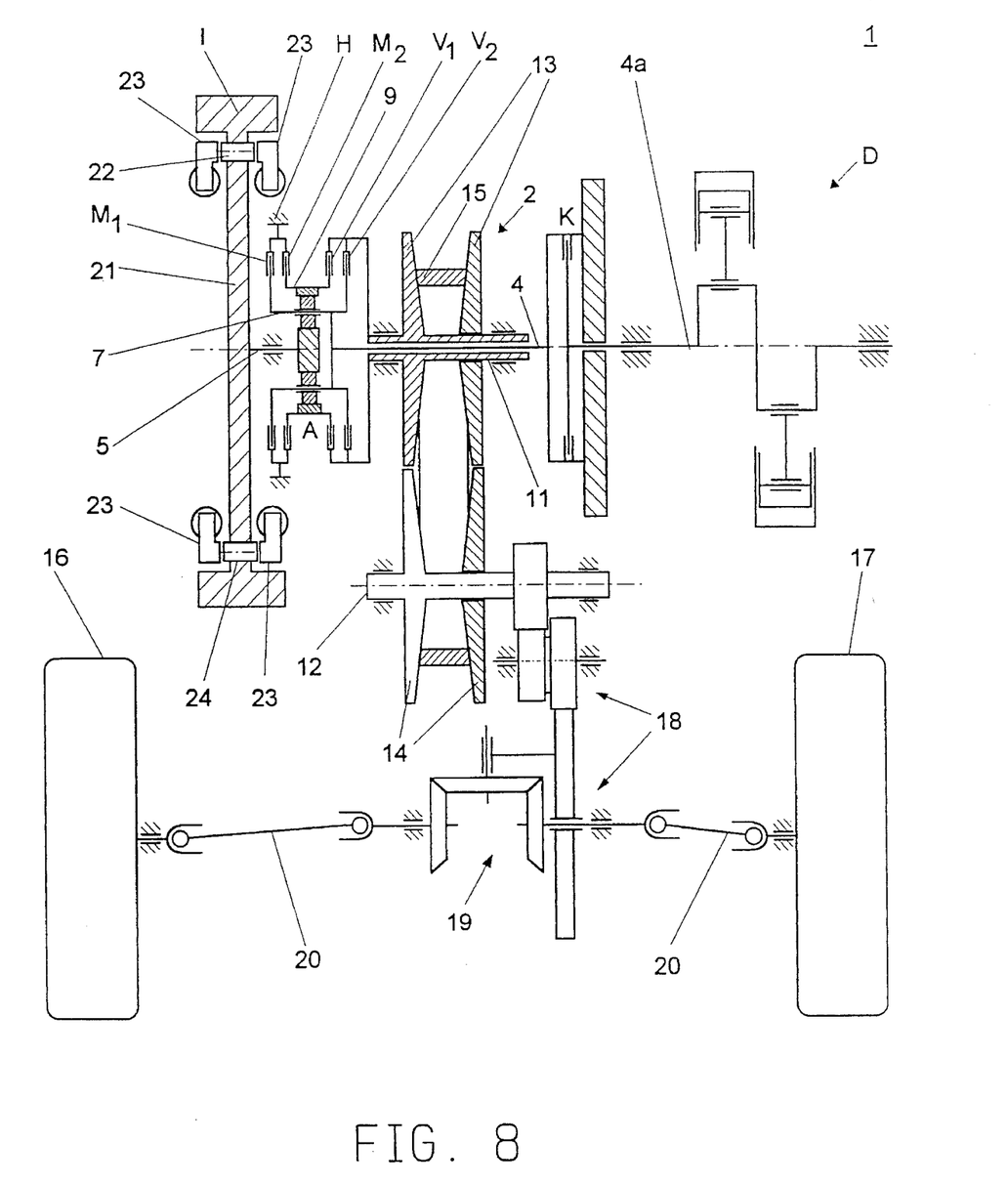
FIG. 8 is a constructional variant of the hybrid driving system depicted in FIG. 2.

FIGS. 1, 2, 6, 7 and 8 show possible embodiments of a hybrid driving system 1, which contains a driving component D, if desired a coupling K, respective planetary couplings/sets A and B, a flywheel I, a continuously variable transmission 2, and a loading process L coupled to the transmission 2, which loading process L is further technically elucidated in the form of a front-wheel drive system for a vehicle in FIGS. 2 and 8. The component D can in principle be an electromagnetic converter, which can function as a motor or otherwise as a generator, but this can also be the internal combustion engine schematically depicted as D in FIGS. 2 and 8. In the case of an internal combustion engine D, such an internal combustion engine is generally equipped with an engine flywheel 3 to prevent vibrations. The engine D has a driving shaft 4/4a, whereby a coupling K is situated between the engine flywheel 3 and the driving shaft 4a (see FIGS. 2 and 8). The coupling K is, just as the couplings $P_{1,2}$, $M_{1,2}$ and $V_{1,2}$, which will be further explained, switchable in the sense that it can be, for example, hydraulically or electrically switched in or out with the assistance of non-depicted means. The driving shaft 4 which subsequently forms a portion of the driving system 1 is coupled, in the embodiments of FIGS. 1, 6 and 7, with two couplings $P_1$ and $P_2$. Planetary set A has, just as planetary set B, a central wheel spindle which in this instance is shared, respective planetary spindles 6 and 7, and respective annular ring spindles 8 and 9. The first driving component, which in this instance is embodied as flywheel I, is located on the common central wheel spindle 5. In the thus created compact and symmetric driving system 1, the common central wheel spindle 5 is, with the exception of the implementation of FIG. 8, hollowly embodied, and a central axle 10 runs herein, which central axle 10 rigidly couples the planetary spindles 6 and 7 together. In the embodiments of the FIGS. 1, 6 and 7, the axle 4 of the engine D which is indicated as the second driving component is coupled to annular ring spindle 8 of set A via coupling $P_1$, while coupling $P_2$ couples the axle 4 with the planetary spindle 6 of set A.

The CVT 2 contains a primary axle 11 and a secondary axle 12 coupled to the load or driving gear L. The clutches $M_1$ and $M_2$ are, according to the embodiment depicted in the figure, affixed on one side to the housing H and on the other side with the planetary spindle 7 and the annular ring spindle 9 of set B, respectively, while the couplings $V_1$ and $V_2$ are connected on the one hand to the (primary) axle 11/11a and on the other hand to the annular ring spindle 9 and the planetary carriers of set B, respectively.

In the embodiments of FIGS. 2 and 8, the planetary gear set A is missing. The CVT which is further elaborated upon in these figures is of the known type with pulleys 13 and 14, between which pulleys a V-band 15 is displaceable with the assistance of non-depicted means for the continuous influencing of the transmission ratio between the primary axle 11 and the secondary axle 12. As has been mentioned earlier, other types of continuously variable transmissions can also be applied in the driving system 1. The secondary axle 12 of the CVT is connected as per normal usage to the wheels 16 and 17 via a final cog stage 18 which can be, if desired, embodied as a reduction stage (see FIG. 8), and also via a differential 19 and driving shafts 20.

Here, the flywheel I depicted in the embodiments of FIGS. 2 and 8 has permanent magnets 22 fixed to the disc portion 21 of the flywheel I, which permanent magnets 22 are magnetically coupled to stationary coils 23. This addition to the hybrid driving system results in the fact that the flywheel I can not only be used as a mechanical energy buffer, but that (if desired) the kinetic energy stored herein can be coupled out to accumulator batteries connected to the coils 23. Moreover, the kinetic energy in the flywheel I can be supplemented by driving the thus created electromagnetic converter 22, 23 as a motor, whereby the application and usage possibilities of the hybrid driving system 1 are considerably increased.

In the case of an internal combustion engine, the electric starter motor can even be omitted. The internal combustion engine can be started by making use of the rotation of the flywheel I and the closing of the clutch K.

Hereinafter, the controlling of the hybrid driving system 1 with the help of the clutches $P_{1,2}$, $M_{1,2}$ and $V_{1,2}$ shall be further elucidated. The 10 different switched states which the above-mentioned clutches can assume are numbered 1, 2, ..., 10 in FIG. 3. All 10 switched stages can be realised with the help of the embodiment depicted in FIG. 1, while the switched states 4, 5, 7, and 10 are invalid for the embodiment depicted in FIG. 2. It should be noted that in order not to complicate FIG. 3 too much, CVT 2 should be envisaged in the block L of the load.

In the switched state $(ST_1)$ the clutches $M_2$ and $V_2$ are empowered. Annular ring spindle 9 of planetary gear set B is thus kept stationary with respect to the housing H. The flywheel I is connected to the primary axle 11 of the transmission 2 via planetary spindle 7 of planetary set B. Planetary set A rotates blindly in unison. In this switched state, as in the switched states 2 to 7 inclusive, which states will be explained in more detail later, energy exchange is possible between the flywheel I and the load L; that is to say the flywheel can drive the load or vice versa.

In general, a transmission ratio of the CVT 2 will exist whereby the transfer of energy between the flywheel I and the load L is zero, this being due to the torques acting on the axles being zero. With any other transmission ratio, the transfer of energy is not zero. The direction of the transfer of energy is dependent upon whether the selected transmission ratio is larger than or smaller than that ratio whereby a torque is transmitted. The magnitude of the transfer of energy is determined by the speed with which the transmission ratio is changed and the magnitude of the loads and inertias connected to the primary and secondary axles 11, 12 of the CVT.

This is also valid for the switched states 2 to 5 which will be explained in more detail later. Directed at the application of the hybrid driving system 1 in vehicles, when using switched state 1, energy can be put into the vehicle by the flywheel, or can be directed back from the vehicle into the flywheel. The speed of the vehicle and the degree to which it is accelerated or braked are dependent upon the transmission ratio of the CVT. This is also valid, be it in the direction of opposite driving motion, in switched state 2, wherein the clutches $M_1$ and $V_1$ are empowered. The difference with $ST_1$ is that now the planetary spindle 7 of set B is kept stationary with respect to the housing H and annular ring spindle 9 is coupled to the primary axle 11.

Switched state 3 can be seen as switched state 1 with second driving component D additionally switched in. In this switched state, the switching of planetary set B is equivalent to that of $ST_1$. However, now with the help of the clutch $P_2$, the second driving component D is switched in. This driving component D is coupled to the planetary spindle 6 of set A and is, via the central axle 10, also coupled to the planetary spindle 7 and is, via central wheel spindle 5, connected to the flywheel I. Furthermore, driving component D is connected via coupling $V_2$ to the load L. The annular ring spindle 8 of set A now rotates blindly in unison.

Magnitude and direction of the transfer of energy between driving component and flywheel I are dependent upon the rate of revolution and the torque delivered by the driving component D. Of course this torque can also be negative. This remark in relation to the transfer of energy between the component D and flywheel I is also valid for the switched states 4 and 5 which will be explained in more detail later.

As an application of switched state 3, we can envisage the acceleration, driving or braking in respect of the driving component D and flywheel I.

Switched state 4 can be seen as switched state 2 with second driving component D additionally switched in. In this switched state both planetary spindles 6 and 7 are blocked via clutch $M_1$ with respect to the housing A. The rate of rotation of the primary axle 11 is dependent upon the transmission ratio of set A. At a minimum, the direction of rotation of driving shaft 4 shall be opposite to that of the flywheel I.

In a vehicular application of switched state 5 one should think of driving or braking with the assistance of the flywheel I and the second driving component D in the case of a generally low rate of revolution of the driving shaft 4. A second possible vehicular application is, in the case where D is an internal combustion engine, the starting of this engine at low rates of revolution with the aid of the energy of rotation of the flywheel, as an alternative for the application of the clutch K. In this state, both planetary spindles 6 and 7 are connected to the primary axle 11 via clutch $V_2$. Annular ring spindle 9 of set B is kept stationary with respect to the housing H via clutch $M_2$. The driving component D is connected to the annular ring 8 of planetary set A via clutch $P_1$. The rate of revolution and direction of rotation of the driving shaft 4 are related to the choice of the transmission ratios of the planetary sets A and B. In this switched state it is possible, as has already been remarked, for exchange of energy to occur between the second driving component D and the first driving component in the form of flywheel I. Moreover, exchange of energy can take place between the component D and the load L, in a manner which has already been explained. Again it is true that magnitude and direction of the transfer of energy between the driving component D and the driving component I are dependent upon the rate of revolution and the torque provided by component D.

In each of the switched state 1 to 5 explained up to this point, as additionally in the still-to-be-explained switched states 8 to 10, at least one axle of the sets A and B is kept stationary with respect to the housing H and one can therefore speak of a fixed relationship between the rates of revolution of the flywheel I and the driving shaft 4.

This is not the case for switched state 6, wherein the clutches $P_2$ and $V_1$ are empowered and planetary set A rotates blindly in unison. In $ST_6$ all axles 5, 7 and 9 of set B rotate. The rate of revolution of the axle 11 depends upon both the rate of revolution of the flywheel I and the rate of revolution of the driving shaft 4. With a constant rate of revolution of axle 11, the rate of revolution of axle 5 will increase with an increasing rate of revolution of axle 4.

The torque being exerted upon the planetary spindles 6 and 7 by the second driving component is in a fixed ratio in balance with the torques being exerted upon the annular ring spindle 9 and the central wheel spindle 5. The transfer of energy in this switched state is dependent upon the direction of rotation of the various axles and upon the relationship between the rate of revolution of the central wheel spindle 5 and the rate of revolution of the annular ring spindle 9 or the primary axle 11.

Figure 4:
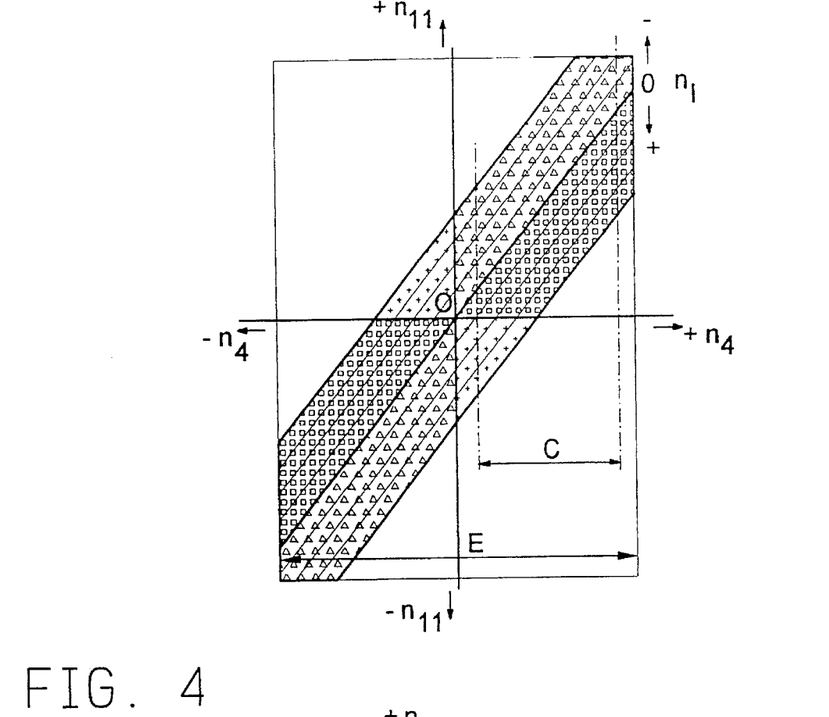
FIGS. 4 and 5, respectively, depict rate of revolution diagrams, which diagrams shall be used in an explanation of the hybrid driving system according to the invention for the case in which the switched states 6 and 7, respectively, as shown in FIG. 3, occur.

Because the control of the magnitude and direction of the transfer of energy in the switched state in question is principally different to the cases in the previously elucidated switched states, FIG. 4 will be used as a basis for further explanation. In FIG. 4, the rate of revolution $n_{11}$ of the axle 11 is drawn vertically as a function of the rate of revolution $n_4$ of the driving shaft 4, whereby the rate of revolution of the flywheel I, that is to say that of the axle 5, is used as parameter. The line through the origin forms the separation line in the first and third quadrants between the region wherein the rate of revolution of the flywheel is positive (under the dividing line) and the line with respect to which the rate of revolution of the flywheel is negative. On the dividing line the rate of revolution of the flywheel, that is to say $n_f$, is zero. This diagram, together with the still-to-be-explained diagram of FIG. 5, is based upon the well-known Willis equation, which equation for the rest in combination with the formula which states that the sum of the moments on the axles of a planetary set should be zero, forms the basic knowledge of those skilled in the art, on the basis of the calculations necessary for the hybrid driving system 1 under discussion can be made.

If an internal combustion engine is used as driving component D then this internal combustion engine can in general, without the assistance of further means, only provide energy to the driving shaft 4 in one direction. The range of application in question for the internal combustion engine is marked with a capital letter C in FIG. 4. If an electric motor is chosen as driving component D, the range of application E is valid. In the region depicted darkly, it is true that, if the flywheel I rotates in the same direction as the motor D, the motor D then drives or brakes both the load L and the flywheel I. In the region located in the same first quadrant, which region lies below the line $n_f$ is zero, and which region is slightly lighter in colour, it is true that the flywheel and the motor as driving component D together provide energy to the load. In the fourth quadrant it is true that the load and the driving component D together drive the flywheel. The above-mentioned is also true in the case of an electric motor in region E, whereby in quadrants two and three the related transfers of energy are indicted in the same colours as in the first and second quadrants.

The rate of revolution of the driving shaft 4 is related to the adjusted transmission ratio of the CVT 2 and the rate of revolution of the flywheel. The torque in the driving shaft 4 is determined by the torque provided by the driving component D. The torque exercised on the axle 5 of the flywheel I is related in a fixed manner to the torque provided by the driving component D, as is indeed the case for the torque exercised on the axle 11 of the load L. The direction of the flows of energy is dependent upon the momentary relationships between the rates of revolution of the axles 11, 5 and 4, and the direction of the torque of the driving component D, as is depicted in FIG. 4.

Figure 5:
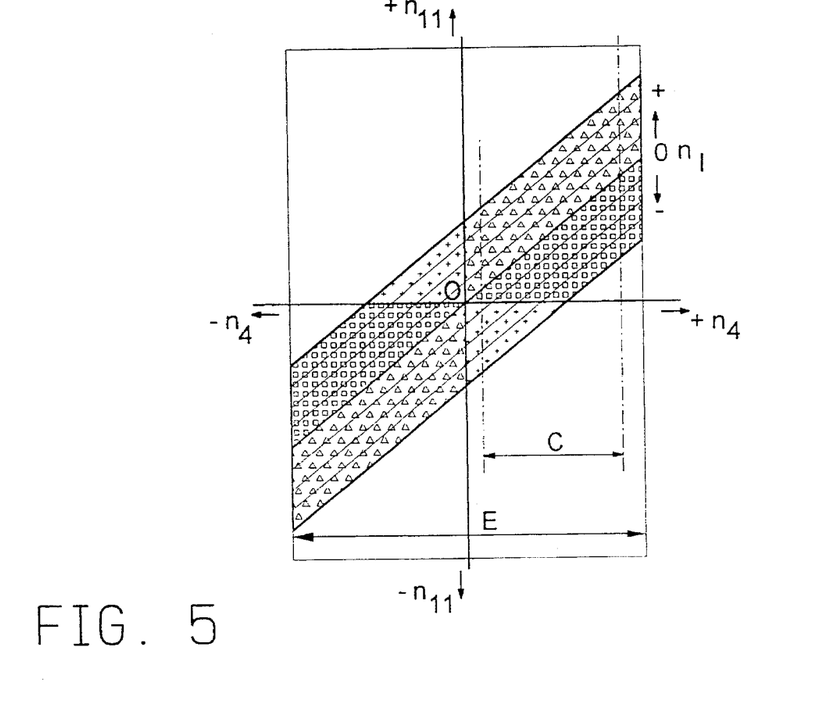
Figure 6:
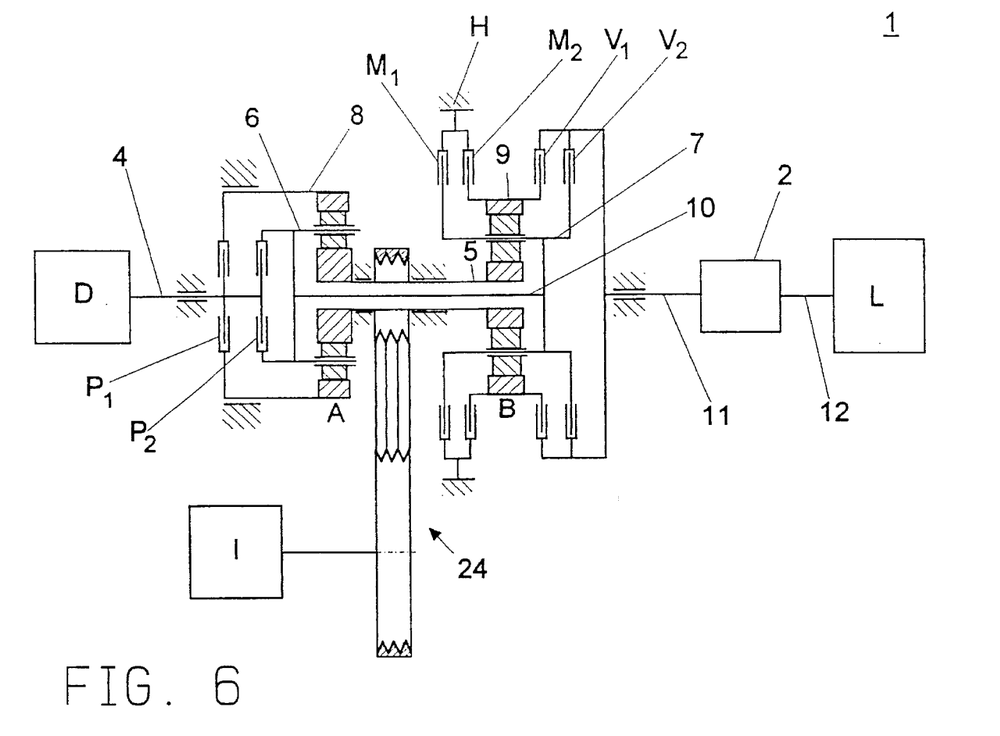
FIG. 6 depicts an embodiment whereby the first driving component is placed eccentrically.
Figure 7:
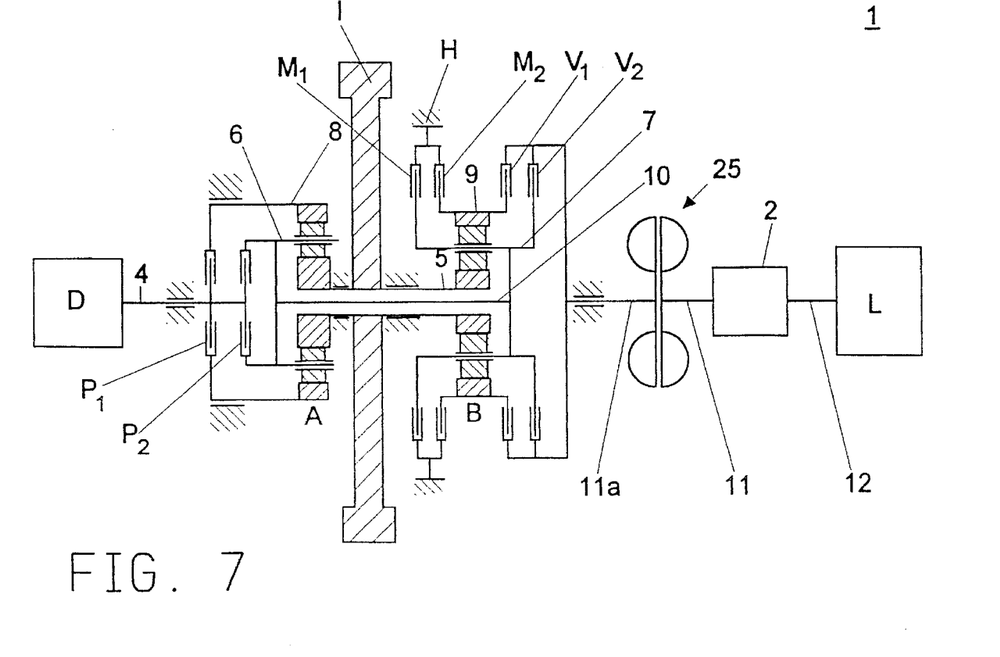
FIG. 7 depicts an embodiment whereby a fluid coupling is included in the transmission chain.

In $ST_7$ the couplings $P_1$ and $V_2$ are switched in, and a diagram similar to FIG. 4 arises, which diagram is shown in FIG. 5. In the dark region located above the line $n_f$ is zero, it is possible in the case of a positive and increasing rate of revolution for energy to be delivered by both the flywheel I and the driving component to the load L, while in the region under the line $n_f$ is zero in the first quadrant energy is either delivered to or taken from both the flywheel I and the load L by the driving component D, while in the slightly lighter region above the line $n_f$ is zero energy can be delivered to or taken from the load L by the flywheel I and the driving component D together.

One thing and another is true for the limited application region C which is valid for the internal combustion engine, while for this application in the fourth quadrant the load L and the component D both deliver energy together to or take energy from the first driving component, that is to say the flywheel I. The wider application region which is to be used when an electric motor is employed as driving component D is again depicted with the letter E, and for the lighter and darker areas a set of reasonings are valid which are similar to those expedited in the aforementioned, while in the second quadrant a similar reasoning can be applied as to that in the fourth quadrant.

The control of the magnitude and the direction of the transfers of energy occurs in an analogous manner to that in switched state 6 for the switched state now in question.

As far as the dark areas in FIGS. 4 and 5 are concerned, it is important to remark that energy can be taken from the flywheel I until the rate of revolution of the axle 5 becomes zero. Of advantage is the fact that in this manner it even becomes possible to make full and complete use of the energy stored in the flywheel I. With respect to the slightly lighter depicted areas, it is especially of importance that the driving component D drives the flywheel during simultaneous driving of the load, and if the flywheel is electromechanically embodied, an accumulator battery can be charged when the rate of revolution of the flywheel is constant. The rate of revolution of component D can simultaneously increase. Finally, in the lightest depicted region, it is possible during simultaneous taking of energy from the load for energy to be applied to the flywheel with the aid of driving component D.

In switched state 8, a "direct drive" arises between driving component D and the load L by means of switching in clutches $P_2$ and $V_2$ while the flywheel I is decoupled. The annular ring spindles 8 and 9 rotate blindly in unison.

In this switched state, the rate of revolution of the driving shaft 4 is related to the choice of the transmission ratio of the transmission 2. Furthermore, the magnitude of the transfer of energy depends upon the torque provided by the driving component D. It is clear that with the application of an internal combustion engine the controller is the same as that in a vehicle equipped with a conventional CVT.

In switched state 9, whereby the clutches $P_2$ and $M_2$ are switched in, the flywheel I is connected to the component D. The load L is then decoupled, while in this switched state, as also in the switched sate 10 which is yet to be explained, an exchange of energy occurs between the component D and the flywheel I, and, in the case where an electromagnetic flywheel is applied, also between the flywheel I and coils 23. Magnitude and direction of the transfer of energy is determined in this switched state by the torque and rate of revolution of the component D and the current through the coils 23, respectively.

In switched state 10, the clutches $P_1$ and $M_1$ are switched in and the flywheel I is loaded in the opposite direction. Here also the load L is decoupled and the annular ring spindle 9 rotates blindly in unison.

On the basis of the preceding description it should be clear that variants of, in particular, the embodiments explained in FIGS. 1 and 2 of the hybrid driving system, are possible. Especially in this light we can think of an embodiment whereby the flywheel I implemented as an electromagnetic converter 22, 23 is applied in the embodiment of FIG. 1, whereby an extremely flexible system with as many as 10 independent switched states arises, which system, by means of the converter 22, 23, has the possibility of exchanging electric energy with an energy source and/or energy storage medium to be connected to the coils 23, while in addition, the inertia of the same magnets 22 is used to store mechanical energy in the form of kinetic energy from, and if desired, deliver to, the component D, the wheels 16, 17, the L, or a combination of these energy consumers or providers. If desired, the symmetric and compact embodiment of FIGS. 1 and 2 can be dropped, so that the flywheel I can be eccentrically placed and be driven by means of a transmission 24 to be coupled to the central wheel spindle 5. This is further indicated in FIG. 6. Here, a poly-v-belt transmission is drawn as the transmission. Naturally, any other type of suitable transmission such as a toothed-belt or cogged transmission is applicable.

If the converter 22, 23 operates as a motor, then a factual tertiary driving is formed in addition to the mechanical driving provided by the flywheel I and the driving by component D.

It speaks for itself that, for example, clutch $M_1$ can be displaced from planetary spindle 7 on one side of the flywheel I to the other side of the flywheel I, so that this is then connected to the planetary spindle 6 indicated in the figure.

A variable maximum loading state of the flywheel I occurs by making the concentrated mass located largely on the circumference dependent in magnitude on the specific application, or by making the maximum in-use rate of revolution dependent upon the specific application.

If a CVT 2 is applied whereby it is not possible that the secondary axle 12 of the CVT be stationary when the primary axle 11 rotates, it is preferable to have a slipping element at our disposal. This can be achieved, for example, by implementing one of the clutches as a synchronisation clutch, or otherwise by including a separate slipping element between the flywheel and the load, such as for example a fluid coupling or a torque converter 25. As an example, FIG. 7 contains a depiction of a fluid coupling 25 placed on the primary axle 11 of the CVT 2.

Possible application can be sought in, for example, storage means for wind energy, storage means for the energy which is delivered by or extracted from, automobiles, trucks, or, for example, buses, trains or other vehicles, during acceleration and deceleration of the vehicle, respectively. There are also good possibilities for application in the raising and lowering of loads.

We claim:

1. Hybrid driving system (1), containing at least a first planetary coupling (B), equipped with a central wheel spindle (5), a planetary spindle (6,7) and an annular ring spindle (8,9), a first driving component (I) coupled to the central wheel spindle (5), a second driving component (D) coupled to the planetary spindle (6,7), a continuously variable transmission (2) with a primary axle (11) and a secondary axle (12) and switchable clutches to provide several driving modes, characterized in that the secondary axle (12) of the continuously variable transmission (2) forms the outgoing axle of the hybrid driving system to be drivingly connected to the input of the load (L) and said switchable clutches (P1,P2; M1,M2) are connected on the one hand to the planetary spindle (6,7) and the annular ring spindle (8,9) and on the other hand to the fixed surroundings (H) and the primary axle (11) of the continuously variable transmission (2).

2. Hybrid driving system according to claim 1, wherein the first driving component is a flywheel and whereby the central wheel spindle (5) is implemented in a hollow fashion and the planetary spindle (6,7) is allowed to run from the planetary coupling (B) placed on one side of the flywheel (I) through the hollow central wheel spindle (5) to the second driving component (D) erected at the other side of the flywheel.

3. Hybrid driving system according to claim 1 or 2, containing a second planetary coupling (A) furnished with a central wheel spindle (5') coupled rigidly to the central wheel spindle (5) of the first planetary coupling (B), and furnished with a planetary spindle (6) coupled rigidly to the planetary spindle (7) of the first planetary coupling (B), and switchable clutches (P1,P2) which on the one hand are connected to the planetary spindle (6) and the annular ring spindle (8) of the second planetary coupling (A), and on the other hand are connected to a driving axle (4) of the second driving component (D).

4. Hybrid driving system according to claim 1, whereby the first driving component which is the flywheel (I) is rotable in a housing to which flywheel (I) one or more magnets (22) or coils (23) are affixed and whereby the housing is provided with coils (23) respectively magnets (22) for magnetically cooperating with the magnets (22) respectively the coils (23) of the flywheel (I).

5. Hybrid driving system according to claim 4, whereby the magnets (22) are embodied as permanent magnets or otherwise as electromagnets implemented with coils.

6. Hybrid driving system according to claim 1, whereby the second driving component (D) is an internal combustion engine with an engine flywheel (3) which can be operated by means of a switchable coupling (K).

7. Hybrid driving system according to claim 1, whereby the first driving component, which is embodied as a flywheel (I), and/or the engine flywheel (3) of the second driving component (D), are mounted in a rotatable fashion in a low-friction housing.

8. Hybrid driving system according to claim 1, whereby the driving system embraces a switched transmission between the (common) central wheel spindle and the first driving component.

9. Hybrid driving system according to claim 1, whereby the switchable clutches are embodied as dry-plate, wet-plate or laminated clutches.

10. Hybrid driving system according to claim 9, whereby the laminated clutch is a hydraulically switchable clutches.

11. Hybrid driving system according to claim 1, whereby a slipping element (25) is switched between the axle (11a) and the load.

12. Hybrid driving system according to claim 9 or 10, whereby the clutch is embodied as a synchronisation coupling.

13. Hybrid driving system according to claim 2, whereby the primary axle (11) of the continuously variable transmission is hollow and one of the planetary couplings is mounted together with the continuously variable transmission and the second driving component (D) on the same side of the flywheel (I).

14. Hybrid driving system according to claim 2, whereby the flywheel (I) is provided with means for limiting the maximum value of the kinetic energy stored in the flywheel (I), which limiting is dependent upon the momentary application of the driving system.

* * * * *